(12) United States Patent
Moline et al.

(10) Patent No.: US 12,486,879 B2
(45) Date of Patent: Dec. 2, 2025

(54) HEAT SHIELD FOR A BRAKING DEVICE OF AN AIRCRAFT WHEEL

(71) Applicant: SAFRAN LANDING SYSTEMS, Velizy-Villacoublay (FR)

(72) Inventors: Sylvain Moline, Moissy-Cramayel (FR); Yannick Tarnowski, Moissy-Cramayel (FR); Arnaud Gapin, Moissy-Cramayel (FR); Sébastien Heude, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 465 days.

(21) Appl. No.: 17/923,120

(22) PCT Filed: May 4, 2021

(86) PCT No.: PCT/EP2021/061697
§ 371 (c)(1),
(2) Date: Nov. 3, 2022

(87) PCT Pub. No.: WO2021/224239
PCT Pub. Date: Nov. 11, 2021

(65) Prior Publication Data
US 2023/0175566 A1      Jun. 8, 2023

(30) Foreign Application Priority Data
May 4, 2020   (FR) ...................................... 2004407

(51) Int. Cl.
*F16D 65/78*   (2006.01)
*B64C 25/44*   (2006.01)
(Continued)

(52) U.S. Cl.
CPC ............ *F16D 65/847* (2013.01); *B64C 25/44* (2013.01); *F16D 55/36* (2013.01); *F16D 65/18* (2013.01); *F16D 2065/785* (2013.01)

(58) Field of Classification Search
CPC ........ F16D 65/847; F16D 55/18; F16D 55/36; F16D 2065/785; B64C 25/44
(Continued)

(56) References Cited

U.S. PATENT DOCUMENTS

| | | | | |
|---|---|---|---|---|
| 3,251,437 | A * | 5/1966 | Moyer | ..................... F16D 55/40 |
| | | | | 188/264 AA |
| 6,419,056 | B1 * | 7/2002 | Dyko | ..................... F16D 65/847 |
| | | | | 188/71.6 |
| 10,145,429 | B1 * | 12/2018 | Whittle | ................... B64C 25/44 |
| 10,400,839 | B1 * | 9/2019 | Leiva | ..................... F16D 65/186 |

(Continued)

FOREIGN PATENT DOCUMENTS

| | | | | |
|---|---|---|---|---|
| CN | 104895970 B * | 8/2017 | ............. F16D 65/78 |
| EP | 1 618 313 A2 | 1/2006 | |

(Continued)

OTHER PUBLICATIONS

International Search Report for PCT/EP2021/061697 dated Aug. 5, 2021.

*Primary Examiner* — Christopher P Schwartz
(74) *Attorney, Agent, or Firm* — Sughrue Mion, PLLC

(57) ABSTRACT

The invention relates to a braking device (1) of an aircraft wheel, comprising a ring (15) which has a plurality of cavities (17) in which actuators (18) are fitted in order to apply a braking force to a stack of discs (11) which extend opposite the ring. The ring is provided with a heat shield (25) which extends opposite a face of the ring directed towards the stack of discs in order to protect the ring from thermal radiation which is generated by the stack of discs. According to the disclosure, the heat shield is provided with holes (26) through which the actuators extend and which have a (Continued)

sectional profile which is formed to reflect the thermal radiation away from the device.

14 Claims, 4 Drawing Sheets

(51) Int. Cl.
*F16D 55/36* (2006.01)
*F16D 65/847* (2006.01)
*F16D 65/18* (2006.01)

(58) Field of Classification Search
USPC .............................................. 188/71.5, 71.6
See application file for complete search history.

(56) References Cited

U.S. PATENT DOCUMENTS

| | | | | |
|---|---|---|---|---|
| 2005/0224634 | A1* | 10/2005 | Rea | F16D 65/847 244/10 |
| 2007/0187192 | A1* | 8/2007 | Anderson | F16D 65/18 188/158 |
| 2020/0141461 | A1* | 5/2020 | Brodard | B64C 25/42 |
| 2021/0381567 | A1* | 12/2021 | Dickel | B64C 25/42 |

FOREIGN PATENT DOCUMENTS

| | | |
|---|---|---|
| EP | 3 453 614 A1 | 3/2019 |
| FR | 1 439 992 A | 5/1966 |
| FR | 2 785 345 A1 | 5/2000 |
| FR | 2 990 188 A1 | 11/2013 |
| FR | 3 054 524 A1 | 2/2018 |
| WO | 2005/001303 A2 | 1/2005 |

\* cited by examiner

HEAT SHIELD FOR A BRAKING DEVICE OF AN AIRCRAFT WHEEL

CROSS REFERENCE TO RELATED APPLICATIONS

This application is a National Stage of International Application No. PCT/EP2021/061697 filed May 4, 2021, which is based on and claims priority to French Patent Application No. 2004407 filed May 4, 2020, the contents of each of which being herein incorporated by reference in their entireties.

The invention relates to the field of braking of aircraft wheels, and more specifically the controlling the heat transfers during braking.

BACKGROUND OF THE INVENTION

An aircraft wheel comprises a rim surrounded by a tyre and connected by a web to a central hub intended to be rotatably mounted on an axle, or spindle, carried by a lower end of a landing gear strut of the aircraft. The wheel is provided with a brake. Such a wheel is, for example, known from document FR-A-2990188.

The brakes used to brake the aircraft wheels generally comprise an aluminium hydraulic ring having cavities in which the braking actuators are fitted. Each of the actuators includes a piston mounted in a slidingly sealed manner about a sliding axis and the ring comprises channels distributing a pressurised hydraulic fluid to each of the actuators to push the piston, and thus apply a braking force on friction elements extending opposite the ring. The friction elements comprise stator discs and rotor discs stacked alternatively on a torsion tube coaxial to the hub of the wheel. The ring is integral with the torsion tube by screwing, the stator discs being rotatably immobilised on the torsion tube and the rotor discs being rotatably integral with the rim of the wheel.

The heat release following the friction of the discs can be significant, in particular the energy to dissipate during braking is high (due to the mass and to the high speed of the aircraft at the time of landing), and lead to an overheating of the brake and of its environment. If the materials constituting the ring and the actuators resist this significant heat release rather well, this is quite different from the hydraulic fluid circulating in the ring, for which an overheating has the effect of reducing its effectiveness, but also its service life. These effects have an impact on the periodicity of the change of hydraulic fluid, which can increase the immobilisation time of the aircraft on the ground.

It is known to arrange a metal thrust plate between the pistons and the stack of discs to limit the heat exchanges between the torsion tube and the ring. However, such a plate has proven to be not very effective and induces a significant addition of mass.

It has also been considered to insert a phenolic resin piece between the torsion tube and the ring to together limit the heat exchanges by conduction. If such a piece is proved to be light and effective, it does not make it possible to guarantee a correct tightening of the torsion tube on the ring.

There are also heat shields arranged between the ring and the stack of discs and which extend from the torsion tube to the actuators. However, such heat shields only partially cover the face of the ring directed towards the discs, such that their effectiveness to protect the ring from thermal radiation following the friction of the discs is limited.

OBJECT OF THE INVENTION

The object of the invention is to propose a heat shield making it possible to overcome, at least in part, the above-mentioned problems.

SUMMARY OF THE INVENTION

In view of achieving this object, the invention proposes a braking device of an aircraft wheel comprising a ring which has a plurality of cavities in which actuators are fitted to apply a braking force on a stack of discs which extend opposite the ring.

According to the invention, the ring is provided with a heat shield which extends opposite a face of the ring directed towards the stack of discs to protect said ring of thermal radiation generated by the stack of discs. The heat shield is provided with holes, through which the actuators extend, and has a sectional profile formed to reflect the thermal radiation to the outside of the device.

Such a heat shield makes it possible to limit the increase in temperature of the ring due to the heat release generated by the friction of the discs when the brake is in use. Thus, when the ring is arranged to distribute a pressurised hydraulic fluid to each of the actuators, the increase in temperature of the hydraulic fluid is also found to be limited, which makes it possible to maximise its effectiveness, as well as its service life.

According to a particular feature, the heat shield includes at least one surface portion which is inclined with respect to a central axis of the ring.

Particularly, the inclined surface portion is curved.

Particularly, the inclined surface portion is flat.

According to another particular feature, the heat shield is one-piece and is held on the ring by being clamped between the ring and a torsion tube, on which the discs of the stack of discs are stacked.

According to another particular feature, the heat shield comprises stiffeners arranged between each of the holes.

Particularly, the stiffeners are stamped ridges.

According to another particular feature, the heat shield is made of a thermally insulating material.

Particularly, a face of the heat shield directed towards the ring is coated with a low-emissivity material.

According to another particular feature, the heat shield comprises, at the periphery, a turned out edge which extends towards the ring.

According to another particular feature, each of the holes comprises, at the periphery, a turned out edge which extends towards the stack of discs.

According to another particular feature, the heat shield comprises tubular portions which extend from an edge of the holes towards the stack of discs to partially surround the actuator and protect it from the thermal radiation generated by said stack of discs.

The invention also relates to an aircraft wheel provided with such a braking device.

The invention also relates to an aircraft landing gear comprising at least one such wheel.

The invention further relates to a heat shield for a braking device of an aircraft wheel, intended to extend between a ring and a stack of discs of the device. The heat shield includes holes through which actuators extend, in use, fitted in cavities of the ring and has a sectional profile formed to reflect, in use, thermal radiation generated by the stack of discs away from the braking device.

BRIEF DESCRIPTION OF THE DRAWINGS

The invention will be better understood in the light of the following description, which is purely illustrative and non-limiting, and must be read with reference to the accompanying drawings, in which.

DETAILED DESCRIPTION OF THE INVENTION

Figure 1:
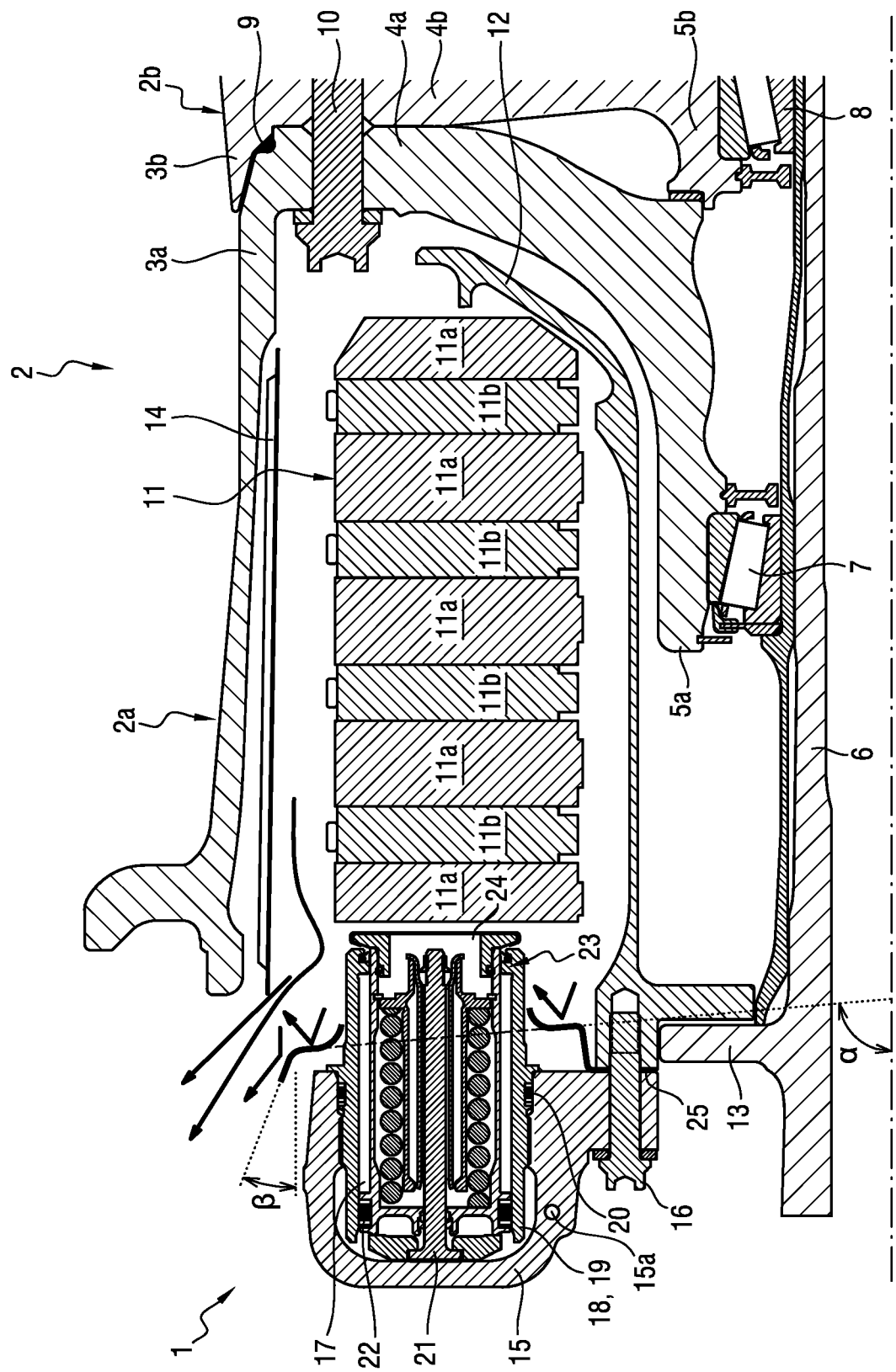
FIG. 1 is an axial cross-sectional view of an aircraft wheel provided with a braking device according to a particular embodiment of the invention.
Figure 2:
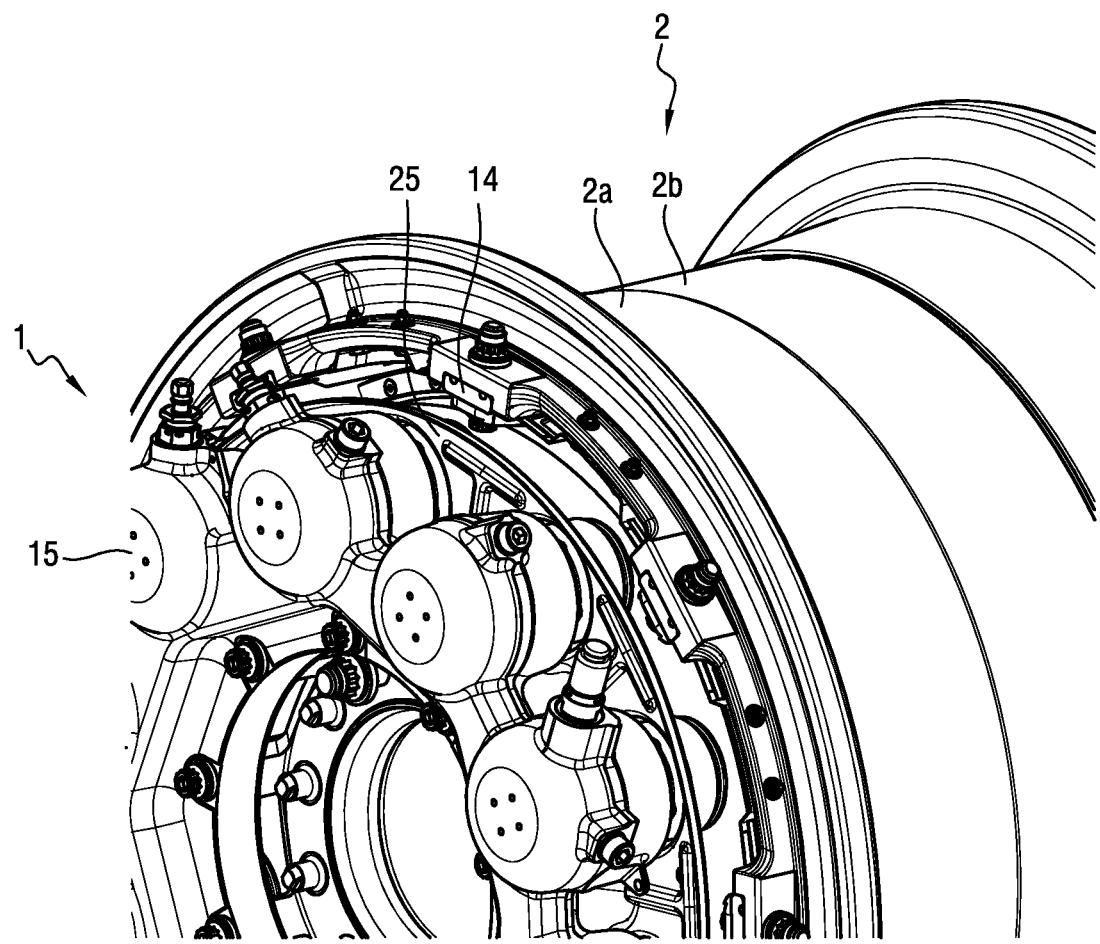
FIG. 2 is a perspective view of the wheel illustrated in FIG. 1, showing the distribution of actuators of the braking device about the axis of rotation of the wheel.

In reference to FIGS. 1 and 2, the invention relates to a braking device, generally referenced as 1, equipping an aircraft wheel 2.

The wheel 2 comprises two half-wheels 2a, 2b which each include an annular rim 3a, 3b connected by a web 4a, 4b to a half-hub 5a, 5b pivotally received on an axle or spindle 6 by means of a bearing 7, 8. The half-wheel 2a includes a groove formed in an edge of the rim 3a and having a sealing gasket 9 arranged therein so that it becomes elastically compressed between the half-wheels 2a, 2b once they are assembled together.

The half-wheels 2a, 2b are moved towards each other in a direction parallel to an axis of rotation X of the wheel 2 and include centring surfaces to ensure that the two half-wheels 2a, 2b are properly positioned relative to each other. The half-wheels 2a, 2b are held in position by assembly bolts 10 arranged in facing holes formed in the webs 4a, 4b.

In a known manner, the bolts 10 are screwed and tightened in order to assemble together the half-wheels 2a, 2b after a tyre (not represented) has been mounted on the rims 3a, 3b. In this position, the sealing gasket 9 is elastically compressed between the half-wheels 2a, 2b and thus prevents the gas contained in a volume defined by the tyre and the half-wheels 2a, 2b from escaping to the outside of the wheel 2.

The braking device 1 comprises brake discs 11, of which the stator discs 11a and the rotor discs 11b, which are stacked alternatively against one another on a torsion tube 12 fixed to a casing 13 of the axle. The torsion tube 12 and the stack of discs 11 extend inside the half-wheel 2a in an annular space defined by an inner surface of the rim 3a, the web 4a and an outer surface of the half-hub 5a extending opposite the inner surface of the rim 3a.

The stator discs 11a are rotatably fixed with respect to the axle 6 and the rotor discs 11b include axial peripheral notches, each receiving a section of a bar 14 fixed on the inner surface of the rim 3a. The bars 14 extend along an axis parallel to the axis of rotation X of the wheel 2 and ensure a rotational coupling of the rotor discs 11b with the rim 3a about said axis X.

The braking device 1 further comprises a hydraulic ring 15 fixed to an end of the torsion tube 12 by means of screws 16. The ring 15 comprises a plurality of cavities 17 symmetrically distributed about the axis of rotation X of the wheel 2 and connected together by channels 15a. Each of the cavities 17 receives an actuator 18 selectively applying a braking force on the stack of discs 11 via a pressurised hydraulic fluid circulating inside the ring 15 through the channels 15a.

The actuator 18 includes a mainly cylindrical jacket 19 which is sealingly received in the cavity 17 of the ring 15. To this end, a sealing gasket 20 engages with an outer face of the sleeve 19 to contain the hydraulic fluid in the cavity 17.

A piston 21 is mounted to slide in the sleeve 19 about a sliding axis parallel to the axis of rotation X of the wheel 2. To this end, a proximal end of the piston 21 includes a protrusion formed as a bearing which adjustingly extends against an inner face of the sleeve 19 and which receives a sealing gasket 22. A distal end of the jacket 19 is formed as a bearing to guide the piston 21 and is provided with a scraper 23. An end of the piston 21 receives a shoe 24 to push against a first stator disc 11a of the stack of discs 11. The ringed distribution of the actuators 18 makes it possible to evenly distribute the braking force over the whole surface of the first stator disc 11a.

The braking device 1 is provided with a heat shield 25 which extends between the ring 15 and the stack of discs 11 to protect said ring 15 from the thermal radiation caused by the friction of the discs 11 during a braking of the wheel 2.

Figure 3:
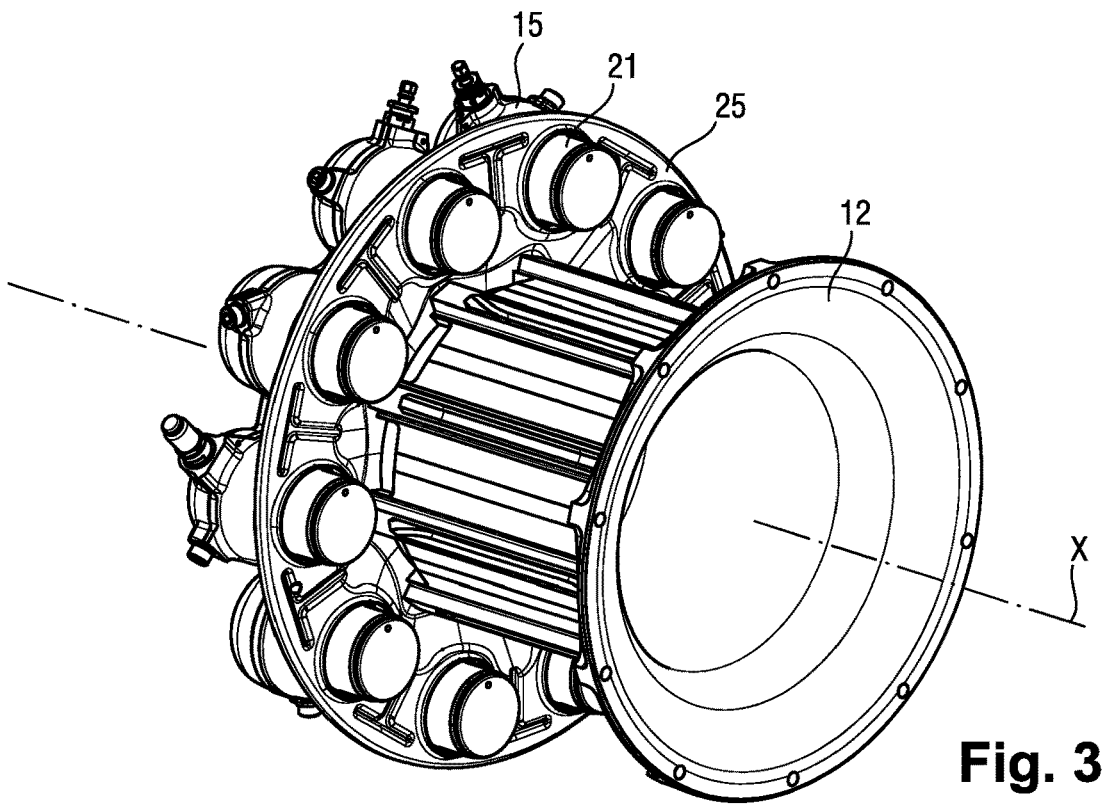
FIG. 3 is a perspective view of the braking device equipping the wheel illustrated in FIG. 1, with no stack of brake discs.
Figure 4:
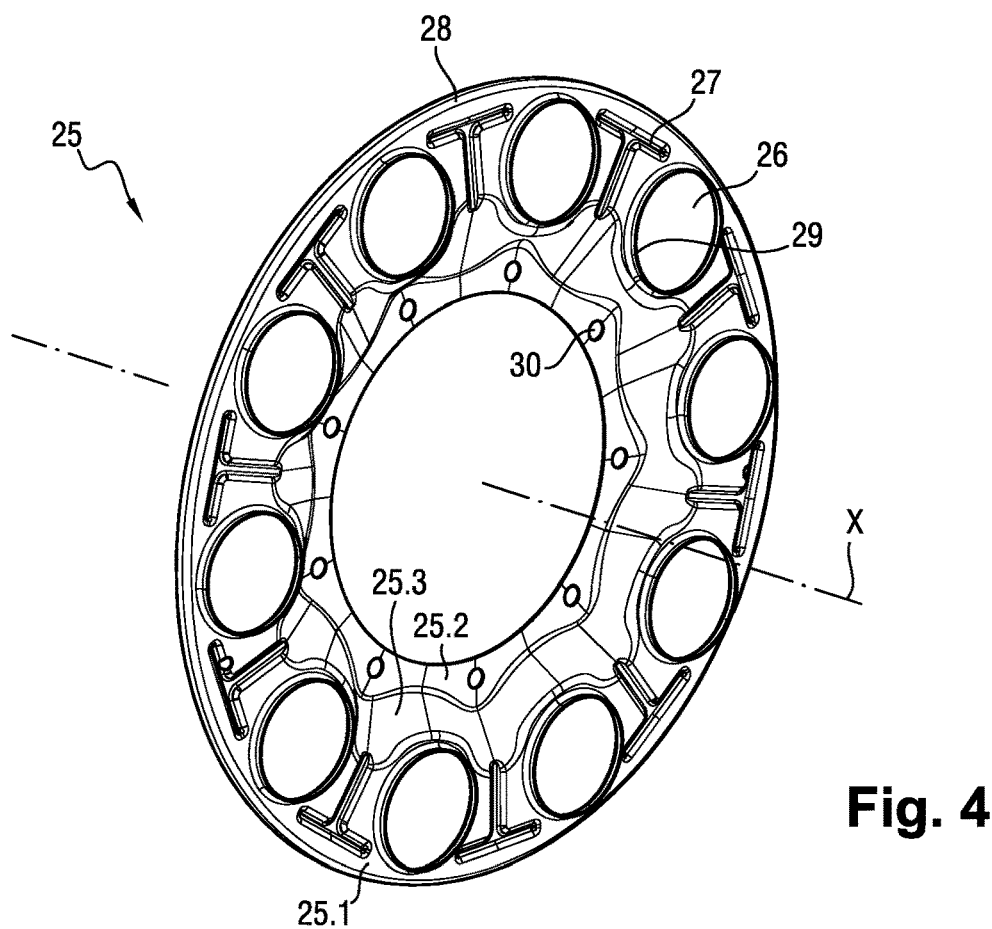
FIG. 4 is a perspective view of the heat shield of the braking device equipping the wheel illustrated in FIG. 1.

As illustrated in FIG. 3, the heat shield 25 is formed of a one-piece sheet, in this case having a thickness of around 0.7 millimetres. The heat shield 25 is mainly annular shaped. An outer peripheral portion 25.1 of the heat shield 25 extends between the torsion tube 12 and the rim 3a and has a sectional profile having a slope $\alpha$ constant with respect to a central axis of the ring 15 which is coaxial to the axis X. The portion 25.1 includes holes 26 through each of which extends one of the actuators 18.

As is illustrated by arrows, the thermal radiation generated by the friction of the discs 11 is reflected on the portion 25.1 of the heat shield 25 opposite, and acquires, due to the slope $\alpha$, a radial component which causes a return of a part of the radiation away from the rim 3a. Furthermore, the flared shape of the portion 25.1 causes an outward natural convective movement of the air contained between the discs and the heat shield 25 which favours the cooling of the discs 11.

In order to improve the thermal insulation performances of the heat shield 25, the face of the portion 25.1 directed towards the ring 15 can be coated with a low-emissivity material.

In view of limiting the deformations and the vibrations of the heat shield 25, the portion 25.1 of the heat shield 25 includes stiffeners 27 distributed symmetrically about the axis X between each of the holes 26. The stiffeners 27 are, in this case, T-shaped stamped ridges.

Moreover, the portion 25.1 includes, at the periphery, a turned out edge 28 which extends towards the ring 15 and forming a slope $\beta$ with respect to the central axis of the ring 15. The turned out edge 28 is oriented towards the rim 3a and makes it possible to rigidify the heat shield 25, but also to limit the risks of cutting off operators.

Furthermore, each of the holes 26 comprises, at the periphery, a turned out edge 29 which extends towards the stack of discs 11. The turned out edge 29 makes it possible to improve the rigidity of the heat shield 25 in the vicinity of the holes 26.

Figure 5:
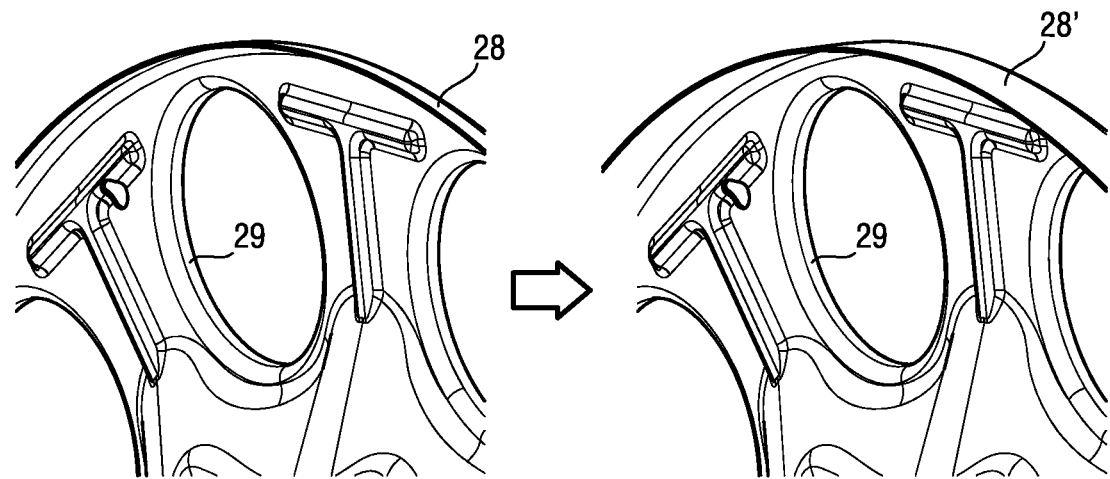
FIG. 5 illustrates a first variant of the heat shield illustrated in FIG. 4, in which the turned out edge at the periphery of the heat shield has been extended.
Figure 6:
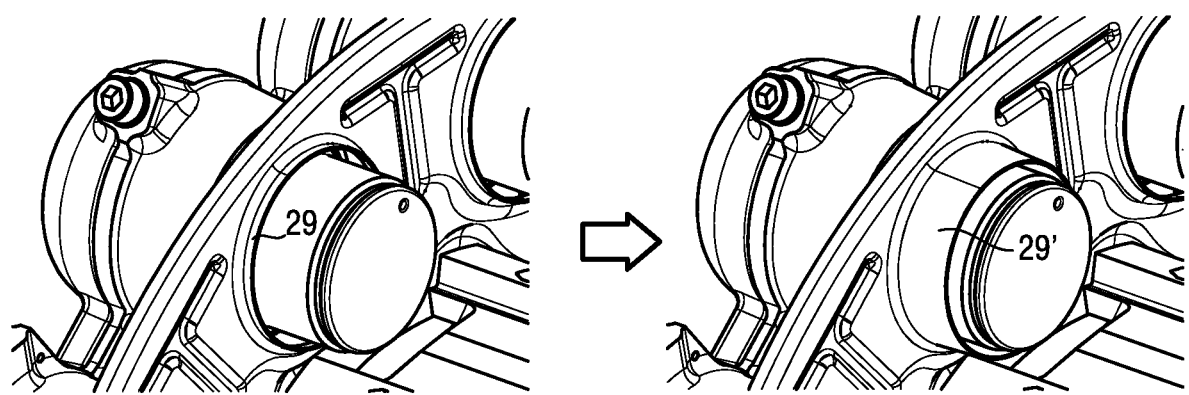
FIG. 6 illustrates a second variant of the heat shield illustrated in FIG. 4, in which the turned out edge providing the holes of the heat shield has been extended.

According to FIGS. 5 and 6, the turned out edge 28 and/or the turned out edge 29 can be extended to form tubular portions 28', 29' respectively making it possible to improve the protection of the ring 15 against the thermal radiation and to partially protect its jackets 19 and the pistons 21 of the actuators 18. In order to facilitate the production of such a heat shield 25, the tubular portions 28', 29' can be formed by a piece fitted on the portion 25.1. The heat shield 25 will thus no longer be made of one piece.

Moreover, the heat shield 25 includes an inner peripheral portion 25.2 clamped between the torsion tube 12 and the ring 15. The portion 25.2 extends in a plane substantially orthogonal to the axis X and comprises holes 30 for the passage of fixing screws 16. The portion 25.2 is connected to the portion 25.1 via a mainly flared shaped connecting interface 25.3. The portion 25.2 makes it possible to hold in position the heat shield in the braking device 1 and to limit the heat exchanges by conduction between the torsion tube 12 and the ring 15 (as illustrated by the double arrows represented in FIG. 1).

In order to even more effectively limit these heat exchanges, it can be provided to implement a washer made of thermally insulating material between the portion 25.2 and the ring 15, or to coat the portion 25.2 with a low-emissivity material.

Naturally, the invention is not limited to the embodiments described, but covers any variant coming within the scope of the invention such as defined by the claims.

The rim can be made up or one or more pieces.

Although, in this case, the heat shield is made of one piece, it can include several pieces, like for example a succession of petals extending about the central axis of the ring.

Although, in this case, the slopes α and β of the heat shield are constant, they can be variable, such that the face of the ring directed towards the stack of discs is curved in shape.

According to the material from which the heat shield is made, the heat shield can have a different thickness of 0.7 millimetres.

According to the space available between the ring and the stack of discs, it is possible to make the slope α vary.

The heat shield can be made of a thermally insulating material, like for example made of polyetheretherketone, cork, ceramic, or of composite material such as that based on a glass ceramic matrix, reinforced by silicon carbide and commercialised under the trademark PyroSic by the company Pyromeral Systems.

The number and the dimensions of the holes in the heat shield can be different from those illustrated.

The number, the shape and the placement of the stiffeners 27 can be different from those illustrated.

The invention claimed is:

1. A braking device of an aircraft wheel comprising a ring which has a plurality of cavities in which actuators are fitted to apply a braking force on a stack of discs which extend opposite the ring, the ring being provided with a heat shield which extends opposite a face of the ring directed towards the stack of discs to protect said ring from thermal radiation generated by the stack of discs, the heat shield being provided with holes through which the actuators extend and having a sectional profile formed to reflect the thermal radiation away from the device,
   wherein the heat shield is held on the ring by being clamped between the ring and a torsion tube on which the discs of the stack of discs are stacked.

2. The braking device according to claim 1, wherein the heat shield includes at least one inclined surface portion with respect to a central axis of the ring.

3. The braking device according to claim 2, wherein the inclined surface portion is curved.

4. The braking device according to claim 2, wherein the inclined surface portion is flat.

5. The braking device according to claim 1, wherein the heat shield is made of one piece.

6. The braking device according to claim 1, wherein the heat shield comprises stiffeners arranged between each of the holes.

7. The braking device according to claim 6, wherein the stiffeners are stamped ridges.

8. The braking device according to claim 1, wherein the heat shield is made of a thermally insulating material.

9. The braking device according to claim 1, wherein a face of the heat shield directed towards the ring is coated with a low-emissivity material.

10. The braking device according to claim 1, wherein the heat shield comprises, at the periphery, a turned out edge which extends towards the ring.

11. The braking device according to claim 1, wherein each of the holes comprises, at the periphery, a turned out edge which extends towards the stack of discs.

12. The braking device according to claim 1, wherein the heat shield comprises tubular portions which extend from an edge of the holes towards the stack of discs to partially surround the actuator and to protect the actuator from the thermal radiation generated by said stack of discs.

13. An aircraft wheel provided with the braking device according to claim 1.

14. An aircraft landing gear comprising at least one aircraft wheel according to claim 13.

* * * * *